United States Patent [19]

Shroyer

[11] 4,353,327
[45] Oct. 12, 1982

[54] AQUARIUM/PICTURE COMBINATION

[76] Inventor: Ronald G. Shroyer, 16608 6th SW., Seattle, Wash. 98166

[21] Appl. No.: 275,381

[22] Filed: Jun. 19, 1981

[51] Int. Cl.³ .......................................... A01K 63/00
[52] U.S. Cl. ...................................................... 119/5
[58] Field of Search ............................... 119/5; 40/160

[56] References Cited

U.S. PATENT DOCUMENTS

| | | | |
|---|---|---|---|
| 41,977 | 12/1911 | Jacob | D30/7 |
| 43,062 | 9/1912 | Ronneburg | D30/7 |
| 367,899 | 8/1887 | Ecker | 40/160 |
| 475,404 | 5/1892 | Lochmann | 119/5 |
| 1,777,944 | 10/1930 | Trovato | 119/5 X |
| 1,974,068 | 9/1934 | Greensaft | 119/5 |
| 1,991,683 | 2/1935 | Kelly | 119/5 |
| 2,144,551 | 1/1939 | Skolnick | 119/5 |
| 2,595,085 | 4/1952 | Kuriyama | 119/5 |
| 2,720,724 | 10/1955 | Rice | 119/5 X |
| 2,814,895 | 12/1957 | Flam | 40/126 |
| 3,276,428 | 10/1966 | Burch | 119/5 |
| 3,735,738 | 5/1973 | Lake | 119/5 |
| 3,763,997 | 10/1973 | Willinger et al. | 206/45.34 |
| 3,773,015 | 11/1973 | Cruickshank et al. | 119/5 |
| 3,874,336 | 4/1975 | Murphy | 119/5 |
| 4,081,666 | 3/1978 | Roehrick | 119/5 X |
| 4,136,638 | 1/1979 | Fedor | 119/5 |
| 4,176,620 | 12/1979 | Kassos | 119/5 |

Primary Examiner—Hugh R. Chamblee

[57] ABSTRACT

An aquarium (48) is housed within the lower portion of a wall mounted housing (10). A three dimensional pictorial presentation (52, 54) is provided above the housing. It includes a three dimensional person (68) expressing interest in fish (80) within the aquarium (48), e.g. in the act of attempting to catch such fish (80). The aquarium (48) and the three dimensional presentation (52, 54) above the aquarium (48) provide a pictorial presentation having an above water portion and a below water portion. The pictorial presentation is framed (12) and the housing (10) includes a glass front (24) within the confines of the frame (12).

2 Claims, 4 Drawing Figures

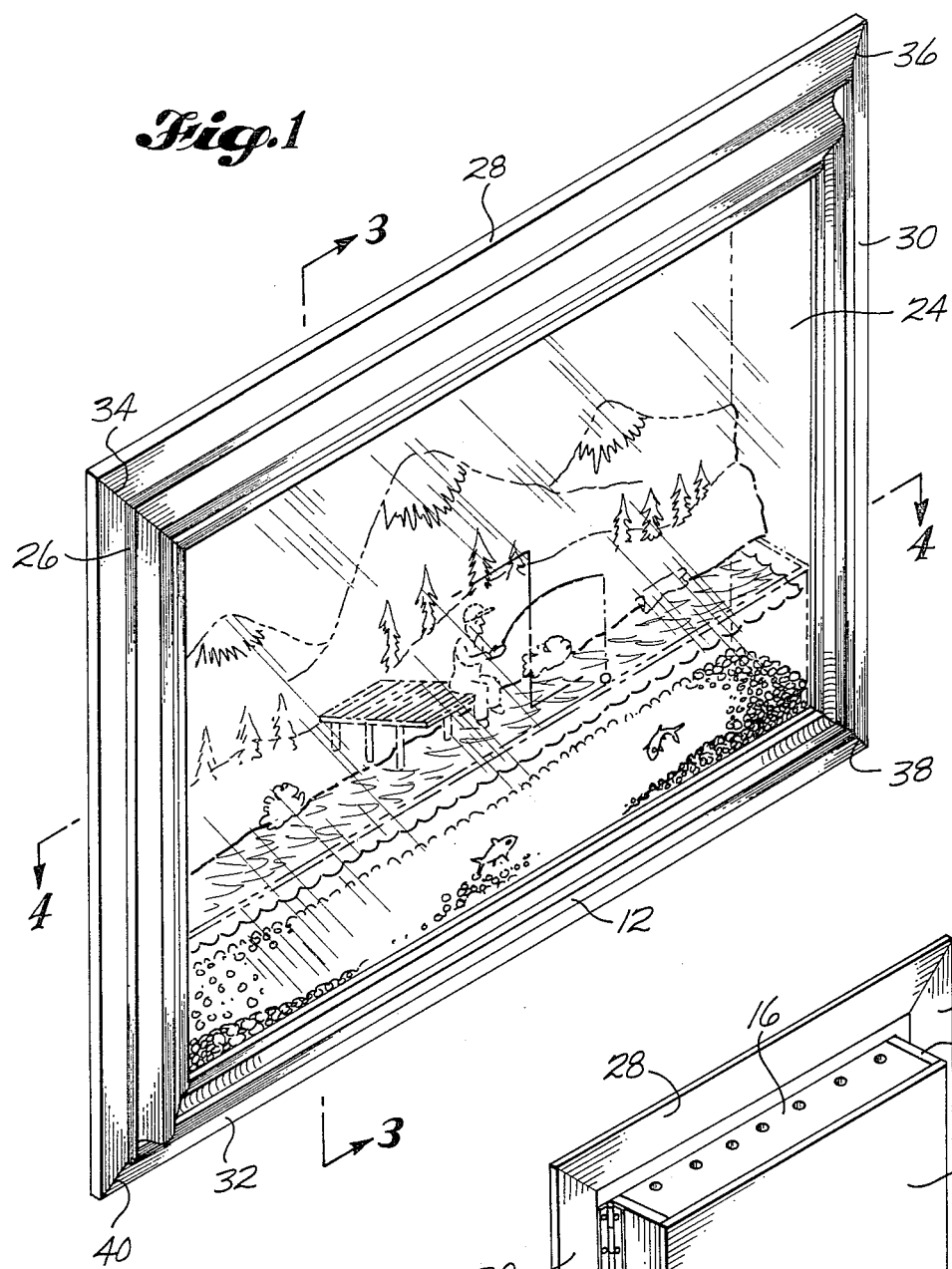
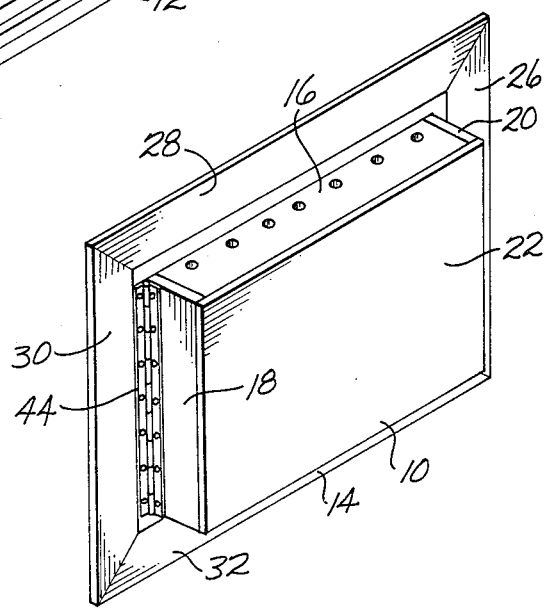

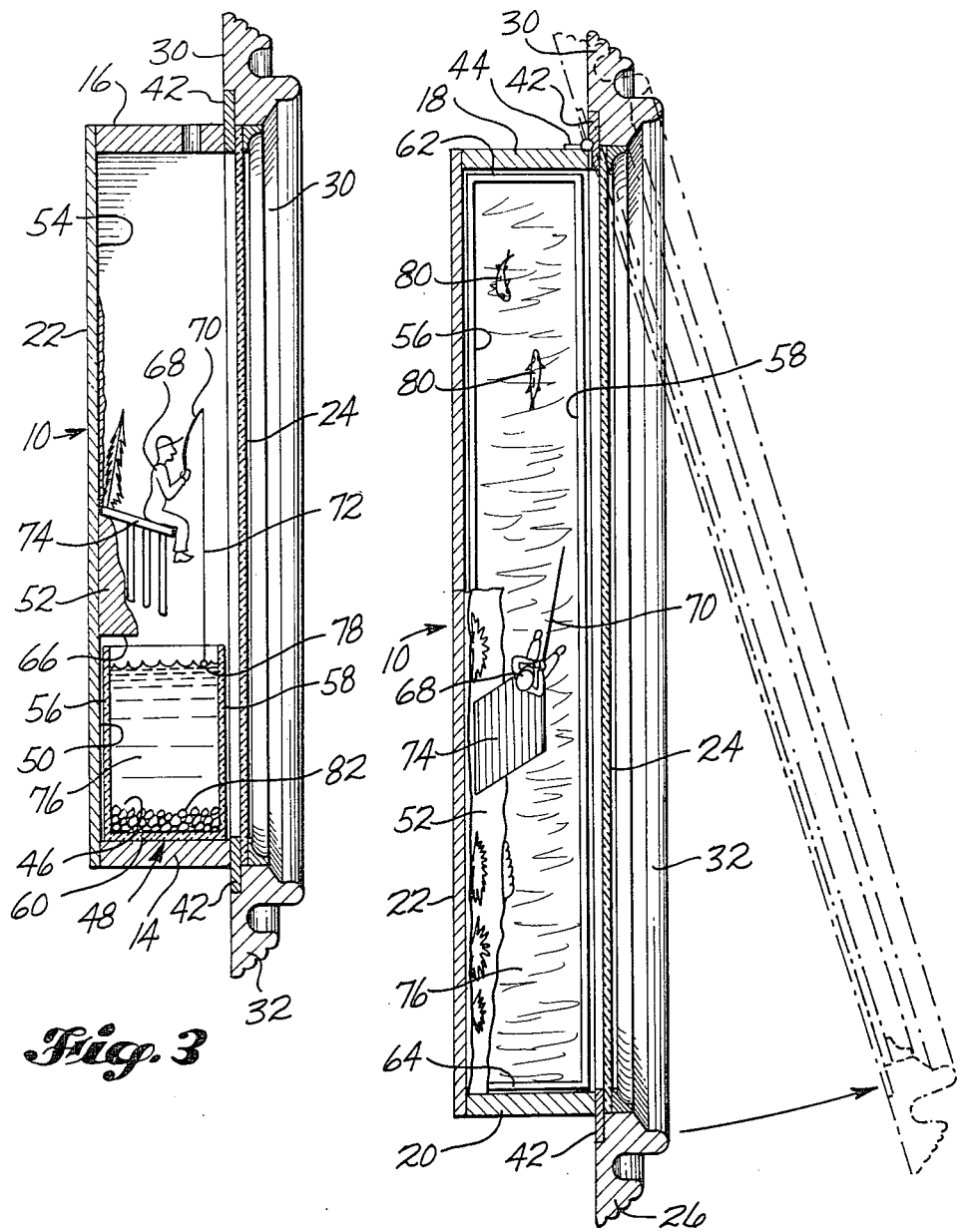

AQUARIUM/PICTURE COMBINATION

DESCRIPTION

1. Technical Field

The present invention relates to a novel pictorial presentation which includes an above water scene and a below water scene, and in particular to such a presentation in which the below water scene is at least partially provided by an aquarium and its contents.

2. Background Art

Aquariums are very old and it is old to provide an aquarium with some sort of background picture. It is also old to provide an aquarium with a decorative frame and it is old to wall mount an aquarium. Examples of known devices of this type are disclosed by U.S. Pat. No. 41,977, granted Dec. 12, 1911, to Samuel Jacob; by U.S. Pat. No. 43,062, granted Sept. 24, 1912, to Francis A. Ronneburg; by U.S. Pat. No. 1,974,068, granted Sept. 18, 1934, to Isidor Greensaft; by U.S. Pat. No. 1,991,683, granted Feb. 19, 1935, to Harry J. Kelly; by U.S. Pat. No. 2,144,551, granted Jan. 17, 1939, to Morris Skolnick; by U.S. Pat. No. 2,595,085, granted Apr. 29, 1952, to Fred Y. Kuriyama; by U.S. Pat. No. 2,814,895, granted Dec. 3, 1957, to Edward Flam; by U.S. Pat. No. 3,276,428, granted Oct. 4, 1966, to Kenneth R. Burch; by U.S. Pat. No. 3,735,738, granted May 29, 1973, to John K. Lake; by U.S. Pat. No. 3,763,997, granted Oct. 9, 1973, to Allen H. Willinger and Albert J. Dinnerstein; by U.S. Pat. No. 3,772,015, granted Nov. 20, 1973, to Roy W. Cruickshank and Jack O. Knight; by U.S. Pat. No. 3,874,336, granted Apr. 1, 1975, to Vivian G. Murphy and by U.S. Pat. No. 4,136,638, granted Jan. 30, 1979, to Joseph J. Fedor.

Of course, the above identified patents speak for themselves and for this reason the various devices disclosed by them will not be specifically described. However, a reader of this document should carefully consider the above patents for the purpose of putting the present invention into proper perspective relative to the prior art.

DISCLOSURE OF THE INVENTION

The present invention is basically characterized by a pictorial presentation having a below water portion and an upper water portion, wherein the below water portion includes an aquarium and the contents of the aquarium.

According to one aspect of the invention, there is a direct association between the above and below water portions of the pictorial presentation. In preferred form, the above water portion of the pictorial presentation includes a three dimensional person expressing interest in fish within the aquarium, such as being shown in the act of attempting to catch such fish.

According to another aspect of the invention, the above water portion of the pictorial presentation includes a three dimensional base portion which overhangs the upper rear portion of the aquarium. The contents of the aquarium provide the below water portion of the pictorial presentation, either alone or in combination with a background picture, pattern or color provided on a lower rear wall portion of a housing in which the aquarium is contained. The above water portion of the pictorial presentation comprises the aforementioned three dimensional base, and a background picture on an upper portion of the back wall of the housing, which may be entirely flat, intirely in relief, or partially flat and partially in relief.

According to another aspect of the invention, the pictorial presentation includes a transparent front wall. Such front wall may be bordered by a decorative frame, in the nature of a picture frame, so that the entire presentation appears as a picture, but with the portion behind the transparent front wall being partially three dimensional and partially involving real water and objects in the water.

These and other objects, features, characteristics and advantages pertaining to and inherent in the present invention will be apparent from the following description of typical and therefore non-limitive embodiments of the invention.

BRIEF DESCRIPTION OF THE DRAWING

Referring now to the several figures of the drawing, wherein like numerals refer to like parts throughout, and wherein:

FIG. 1 is an isometric view of an embodiment of the invention, taken from above and looking towards the front and one end of the embodiment;

FIG. 2 is a smaller scale isometric view looking towards the rear of the embodiment, such view also being taken from above and looking towards the rear and one end of the embodiment, and showing a hinge connection between the forward, decorative frame portion of the unit, and the rear, housing portion of the unit, and also showing air holes in the upper wall of the rear housing;

FIG. 3 is a vertical sectional view taken through the embodiment, substantially along line 3—3 of FIG. 1, showing the relationship between the three dimensional above water portion of the background picture and the aquarium tank; and FIG. 4 is horizontal sectional view taken substantially along line 4—4 of the embodiment, and including a broken line showing of the forward frame portion of the apparatus, swung outwardly from its closed position.

BEST MODE OF THE INVENTION

Referring again to the several figures of the drawing, the wall mounted aquarium/picture of the present invention comprises a housing 10 and a forwardly directed, decorative front 12.

Housing 10 comprises a bottom wall 14, a top wall 16, end walls 18, 20 and a rear wall 22, all secured together to form a rectangular box like structure which is open at its front.

Cover 12 covers the open front and includes a glass wall 24. In the illustrated embodiment, the cover 12 is in the nature of a picture frame, comprising four sides 26, 28, 30, 32, connected together at mitered corners 34, 36, 38, 40. Frame sides 26, 28, 30, 32 define a central opening which is recessed from the rear side of frame 12. Edge portions of the glass wall 24 are received within the recesses and the glass wall 24 is held in place by mounting strips 42 (FIGS. 3 and 4).

In the illustrated embodiment, a piano hinge 44 or some other hinge structure that is suitable is used to connect a side member of the frame 12 to an end wall 18 of the housing 10, for pivotal movement of the frame 12 away from the housing 10.

According to the invention, a viewer of the wall mounted aquarium/picture, looking towards the glass wall 24, sees a pictorial presentation having a lower, below water portion, and an upper, above water portion.

The below water portion comprises the contents 46 of an aquarium 48, either alone or in combination with a pictorial background 50 provided on the front face of the housing wall 22 in the region of such front face which is positioned immediately behind the aquarium 48.

The above water portion of the presentation comprises a three dimensional scene 52, either alone or in combination with a two dimensional scene 54 provided on the front face of wall 22, in a region above and/or intersperced with the three dimensional presentation 52.

The aquarium is rectangular in form and comprises a rear wall 56, a front wall 58, a bottom wall 60 and end walls 62, 64, all connected together at their adjoining edges, in accordance with known techniques with adjoining glass or plastic walled aquariums. The aquarium 48 is sized to fit within a nook formed vertically between the lower boundary 66 of the three dimensional presentation 52, and housing bottom wall 14, and horizontally between the end walls 18, 20 of housing 10. As shown by FIG. 3, the front to rear depth of aquarium 48 is only slightly smaller than the inner surface width of housing wall 14. As shown by FIG. 4, the overall width of aquarium 48 is only slightly smaller than the spacing between the inner surfaces of walls 18, 20 of housing 10. Also as shown by FIGS. 3 and 4, the inner edges of the frame members 26, 28, 30, 32 partially hide the end and bottom walls 62, 64, 66 of aquarium 48.

As best shown by FIGS. 3 and 4, the three dimensional, above water portion of the presentation projects out over the open top of aqurium 48. In preferred form, the above water portion of the presentation in some manner cooperates with the aquarium. In the preferred form, the above water three dimensional presentation includes a fisherman 68 holding a fishing pole 70. A line 72 depends from the end of pole 70 down into a body of water 74 within the aquarium 48. The fisherman 68 may be standing, or may be sitting, such as on a dock 74, as illustrated. The fisherman 68 is appropriately positioned so that space exists between the front portion of the fisherman 68 and the front wall 58 of aquarium 48, for receiving the fishing line 72 (FIGS. 3 and 4).

As a novelty item, a basket like fish food holder 78 may be provided at the lower end of fish line 72. If used, the holder 78 should be constructed large enough that it cannot be swallowed by fish 80, within the body of water 76, but can be nibbled on by the fish 80. This would give the appearance of the fisherman 68 actually being in the act of catching a fish, without causing any injury to the fish 80. The fishing pole 70, may be made relatively limber so that it will easily flex in response to a fish nibbling the bate holder 78.

In the illustrated embodiment, gravel 82 is provided in the bottom of the aquarium 48, to simulate a lake bottom, for example. The wall surface 50 may be provided with a blue cover of some type. The dock 72, may be constructed to project outwardly from a three dimensional land mass, the lower surface of which constitutes the aforementioned surface 66. Trees and mountains, may be included in the above water portion of the presentation. For example, the trees and mountains may be painted on the upper front surface 54 of wall 22. They may be either flat presentations or presentations with some depth or relief. Also, some or all of the trees may be partially or totally three dimensional in form.

By way of typical and therefore non-limitive example, in another embodiment the sitting fisherman may be replaced by a standing person holding a spear in his hand, and posed as if about to catch a fish by spearing. Also, the above water land presentation may be replaced by a boat presentation, in which a fisherman is carried by the boat. Or, the boat may appear to have a glass bottom and the presentation may include people in the boat positioned to look down through the bottom at the fish.

It will be understood that the invention may be embodied in other specific forms without departing from the spirit or central characteristics of the invention. The embodiments which have been illustrated and described are therefore to be considered in all respects as merely being illustrative and not restrictive. The scope of the invention is not to be determined by the foregoing description and/or details of the drawing, but rather by the appended claims, and all changes which come within the meaning range of equivalency of the claims are to be considered to be embraced by the claims.

I claim:

1. A picture presentation, comprising:

a three dimensional housing including a bottom wall, a top wall, a pair of end walls, and a rear wall, all together defining an interior, and an openable front for said housing including a transparent front wall through which the interior of the housing can be viewed;

means within said housing interior presenting a pictorial presentation, including a three dimensional portion which projects forwardly from the rear wall and includes a lower boundary that is spaced vertically above the bottom wall of the housing, so that a space is defined vertically between the bottom wall and the lower boundary of the three dimensional portion of the pictorial presentation, and horizontally between the two end walls, said space being of rectangular form;

an aquarium tank of rectangular form sized to fit snugly within said space, said aquarium tank being slidable into and outfrom said space from the front of the housing, said aquarium tank having a transparent vertical front wall which is closely adjacent the transparent front wall of the front closure when the aquarium is housed within said space, and said three dimensional portion overhanging said aquarium tank;

said pictorial presentation being of an above water scene;

said aquarium tank presenting a below water level pictorial presentation; and said three dimensional portion of the pictorial presentation including a representation of a person in an act having an association with the below water pictorial presentation presented by the aquarium tank.

2. A picture presentation according to claim 1, wherein the representation of a person is of a person holding a fishing pole and a line depends from said fishing pole down into the aquarium tank.

* * * * *